United States Patent [19]

Ziegler et al.

[11] Patent Number: 4,680,493
[45] Date of Patent: Jul. 14, 1987

[54] VENTILATING DEVICE FOR A GENERATOR

[75] Inventors: Gerhard Ziegler, Besigheim; Karl Gregotsch, Flacht; Rudolf Herrmann, Flein, all of Fed. Rep. of Germany

[73] Assignee: Dr. Ing. h.c.F. Porsche Aktiengesellschaft, Fed. Rep. of Germany

[21] Appl. No.: 747,570

[22] Filed: Jun. 24, 1985

[30] Foreign Application Priority Data

Jun. 23, 1984 [DE] Fed. Rep. of Germany ....... 3423319

[51] Int. Cl.$^4$ .............................................. H02K 9/06
[52] U.S. Cl. ........................................ 310/62; 310/89; 474/93
[58] Field of Search .................... 310/62, 63, 58, 59, 310/53, 75 R, 89; 474/93

[56] References Cited

U.S. PATENT DOCUMENTS

| 1,998,087 | 4/1935 | Koch, Jr. ............................... 310/62 |
| 2,604,501 | 7/1952 | Wightman .............................. 310/63 |
| 3,127,779 | 4/1964 | Hanke et al. .......................... 474/93 |
| 4,074,156 | 2/1978 | Widstrand et al. .................... 310/62 |
| 4,476,405 | 10/1984 | Komurasaki ...................... 310/63 X |
| 4,488,070 | 12/1984 | Iwaki et al. ............................ 310/62 |
| 4,525,993 | 7/1985 | Dumoulin et al. ............... 474/93 X |
| 4,554,472 | 11/1985 | Kumatani ............................. 310/62 |

FOREIGN PATENT DOCUMENTS 3211502  11/1982  Fed. Rep. of Germany .

Primary Examiner—Harold Joyce
Attorney, Agent, or Firm—Barnes & Thornburg

[57] ABSTRACT

A ventilating arrangement for a vehicle generator is proposed where a rotor-stator unit is arranged in a housing equipped with air-guiding ducts. A fan wheel is connected in front of this rotor-stator unit which by means of a pulley is drivingly held on a shaft of the rotor. The pulley is developed as an air delivery wheel and comprises supporting ribs forming radial guide blades. The air delivery wheel serves to partially compress and assist the air flow to the fan wheel.

3 Claims, 4 Drawing Figures

VENTILATING DEVICE FOR A GENERATOR

BACKGROUND AND SUMMARY OF THE INVENTION

This invention relates to a ventilating device for a generator of the type having a rotor stator unit arranged in a housing with air ducts and with a fan wheel on the shaft of the rotor.

A generator is known from No. DE-OS 32 11 502 which is arranged in a housing having air guiding ducts and cooling air outlets. Via a fan wheel located within the housing and close to a front wall, air entering against the driving direction of the vehicle through outside openings is pressed into and through the housing. On the front side and outside the housing, a pulley is disposed on a shaft of the generator rotor, said pulley partially covering the outside openings and preventing an unimpaired air supply for the cooling of the generator rotor and stator. This impairment of the air current results in an increase of the noise emission which, in a disadvantageous manner, is increased even more by a relatively narrow and labyrinth-type air guiding within the housing to the air outlets.

It is an objective of the invention to provide a ventilating device for a generator of the initially mentioned type by means of which an efficient cooling and ventilating effect is achieved, aiming at the same time at a simultaneous clear lowering of the noise emission.

By means of an advantageous guiding of the air current which permits a supply of cooling air through the supporting ribs of the air delivery wheel, an air guiding is achieved near the rotational axis. As a result a favorable flow against the fan wheel (small flow duct diameter) can be obtained, or a fan wheel can be realized that has favorable dimensions with respect to flow mechanics and acoustics, such as a smaller outside diameter.

Because of the streamlined forwarding of the air current to the rotor-stator unit or to the thermally sensitive electric and electronic components, an efficient cooling takes place with an improved efficiency as compared to the known construction according to No. DE-OS 32 11 502. The pulley is also designed as an air delivery wheel and at the same time leads the supplied air in a compressing manner to the fan wheel connected at the outlet side. By means of the supply that is unimpaired from the outside and the streamlined entering of the air current from the radial outflow from the fan wheel into the cylindrical part of the housing via a curved air guiding surface of a closing cover, flow resistances are avoided and a possible generating of noise is counteracted. Because of the cover effect, the housing also contributes to the muffling of air sounds.

In addition, because of the expanding space in the housing downstream from the fan wheel, the radially emerging air current of relatively high speed is slowed down in such a way that during the entering into the air ducts, no additional noises can occur.

By means of the air guiding, a targeted flow through the generator is achieved from the front toward the rear.

The supply with cold cooling air takes place directly from the front side of the vehicle. Also in the case of a supply of air via a hose, this arrangement is advantageous because the hose can be kept short and can be constructed without any deflection.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
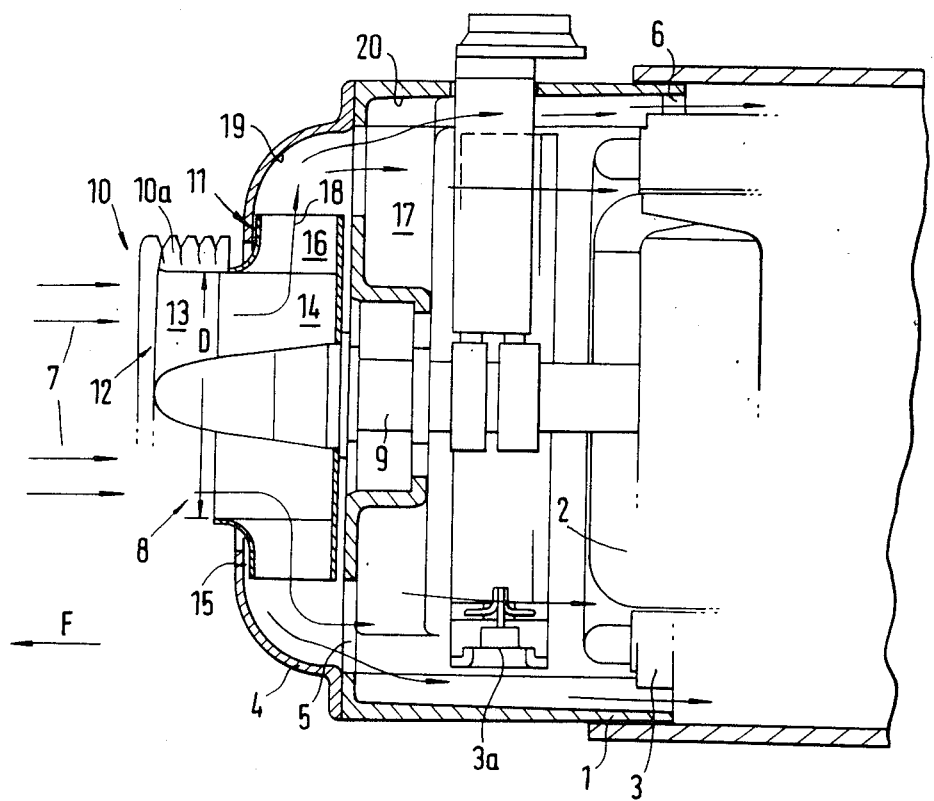
FIG. 1 is a sectional schematic view of a generator having a ventilating device constructed in accordance with a preferred embodiment of the present invention.
Figure 2:
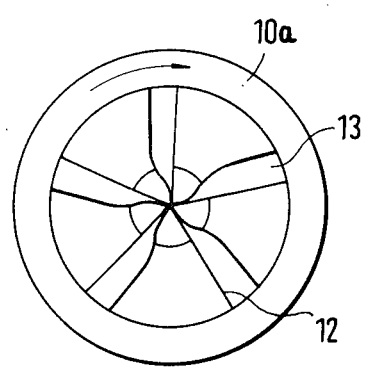
FIG. 2 is a front view of the air delivery wheel of the embodiment of FIG. 1.

As shown in FIG. 1 in detail, a generator having a rotor 2, a stator 3 and the required electric and electronic components 3a is arranged in a cylindrical housing. 1. The housing 1 on the front side is closed via a box-type capsule cover 4 with the exception of a running gap 15. Via openings 5 on the front side, the air current 7 is introduced into the housing 1, and via guide ducts 6 and via a bypass duct is forwarded further in the housing 1, where it flows around the individual components of the generator. The air current flows out via outlet openings on the rear side in the housing 1, as shown in detail by arrows.

The ventilating device 8 is arranged on the front side of the generator, is held on a shaft 9 of the rotor 2 and includes an air delivery wheel 10a and a fan wheel 11. The air delivery wheel 10a is arranged in front of the fan wheel 11 with respect to the air current 7, and at the same time forms a pulley 10. It has supporting ribs 12 forming radial guide blades 13. Preferably, the air delivery wheel 10a and the fan wheel 11 are held on the shaft 9 so that they are located directly behind one another, the air delivery wheel 10a being developed as a compressing suction fan. The free opening diameter D between the supporting ribs 12 corresponds to approximately the size of the air supply duct 14 in the fan wheel 11.

The fan wheel 11 is arranged within the housing 1 and is closed to the outside via cover 4 with the exception of a running gap 15. The air delivery wheel 10a is provided in front of the cover. It may be arranged within a connection piece 21 for an air intake pipe according to the preferred embodiment illustrated in FIG. 3.

Figure 3:
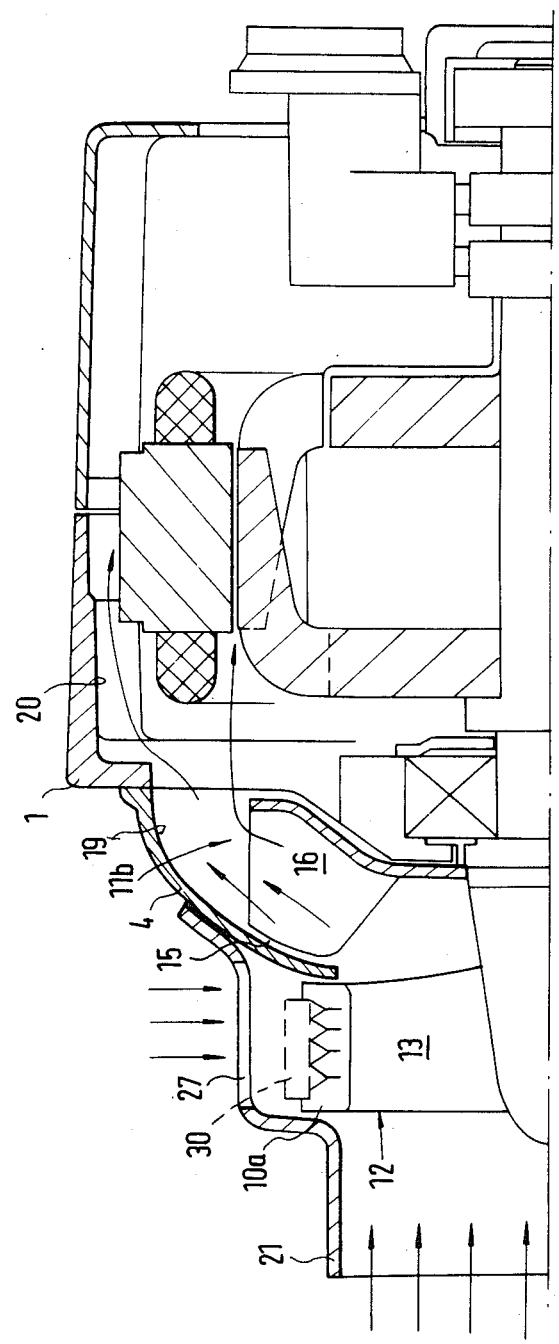
FIGS. 3 and 4 are views similar to FIG. 1 showing other embodiments of ventilating devices constructed in accordance with the present invention.

According to the embodiment of FIG. 3, a connection piece 21 is connected with the cover 4. It extends over part of the circumference of the pulley 10 and, on the front side, in a sealing manner, it rests against the cover 4 adjacent the pulley 10. Openings 27 on the side of the circumference are provided for the emerging of the driving belt 30. The fan wheel 11b is designed in such a way that the emerging air current emerges approximately in the slope of the inside surface of the cover, flows along it and is then axially deflected into the connecting cylindrical housing 1.

Figure 4:
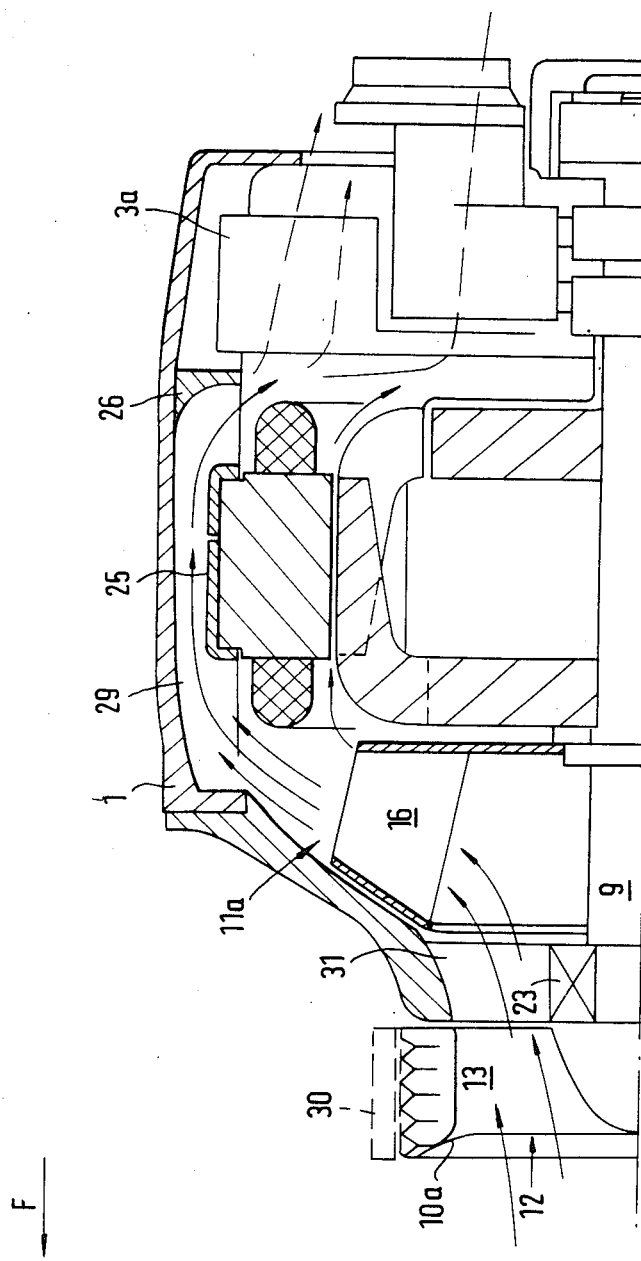

Another embodiment according to FIG. 4 is equipped with bypass ducts 29, in parts of which insulator means 25 are provided. As a result, a targeted supply of cold air to heat-sensitive components 3a (such as the diode plate) can be carried out. Via a deflection part 26, the air current is forced in a predetermined direction and in a targeted manner is guided to the heat-sensitive components 3a (diode plate).

For receiving supporting forces of the highly strained belt 30, the shaft 9 is held by means of a bearing 23 arranged between the air delivery wheel 10a and the fan wheel 11; 11a; 11b. A supporting in the direction of the housing 1 takes place via ribs 31 having air passages between them.

According to another embodiment of the invention, the fan wheel 11 may also be arranged at the rear side of the housing 1. In mutual coordination with the air delivery wheel 10a, it can be designed as a pressure fan or as a suction fan.

The air is pressed between the guide blades 13 of the air delivery wheel 10a, is compressed and via the duct 14 is conveyed into the directly connecting fan wheel 11; 11a; 11b. The fan wheel has radial guide blades 16 directing the air into a high-pressure space 17. The air current 18 emerging from the fan wheel 11, via the air-guiding surface 19 which is curved because of the cover 4 is guided through opening 5 into the housing 1 and from here flows through the housing 1 until it reaches the outlet openings.

The air current 7 can be supplied to the inside of the housing without impairment, the shaped cover 4, in particular, resulting in a streamlined course of the air flow.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A ventilating arrangement for a motor vehicle generator of the type having a rotor-stator unit arranged in a housing provided with air guiding ducts, said ventilating arrangement comprising:
   the housing having air guiding ducts;
   a radial directing fan wheel held on a shaft of the rotor upstream of the rotor-stator unit having an inlet diameter;
   a drive pulley formed as an air delivery wheel on the shaft, said air delivery wheel comprising supporting ribs forming radial guide blades, which act as a precompressing fan, said precompressing fan having an outlet area approximately equal to the inlet diameter of the fan wheel,
   a front side cover means surrounding at least the downstream side of the fan wheel and held to the housing with a running gap between the cover and housing;
   the side cover means forming a curved inside air guiding surface entering into a cylindrical housing surface of the housing; said air-guiding surface being disposed opposite and spaced from the air current radially emerging from the fan wheel;
   the cover means in the housing closing off a front side high-pressure space which downstream has a larger cross-section than in the area of a radial air outlet of the fan wheel; and
   wherein the cover means directs air flow axially through a plurality of flow paths in the motor vehicle generator.

2. A ventilator arrangement according to claim 1 wherein an air supply duct surrounds and extends upstream of the air delivery wheel.

3. A ventilator arrangement according to claim 2 wherein an opening means is provided in the supply duct to permit attachment of a fan belt to the drive pulley.

* * * * *